United States Patent [19]

Inoue et al.

[11] 4,351,609

[45] Sep. 28, 1982

[54] PHOTOGRAPHING APPARATUS

[75] Inventors: Shunzo Inoue; Takeshi Nagasawa, both of Yokohama; Hitoshi Yanagawa, Tokyo; Toshio Iwaya, Machida; Michio Kasuya, Fuchu, all of Japan

[73] Assignee: Canon Kabushiki Kaisha, Tokyo, Japan

[21] Appl. No.: 234,602

[22] Filed: Feb. 17, 1981

[30] Foreign Application Priority Data

| Feb. 22, 1980 | [JP] | Japan | 55/21346 |
| Mar. 17, 1980 | [JP] | Japan | 55/33587 |
| Dec. 19, 1980 | [JP] | Japan | 55/180238 |
| Jan. 9, 1981 | [JP] | Japan | 56/1850 |
| Jan. 9, 1981 | [JP] | Japan | 56/1851 |
| Jan. 12, 1981 | [JP] | Japan | 56/2877 |

[51] Int. Cl.$^3$ .................. G03B 27/48; G03B 27/52
[52] U.S. Cl. .................................................. 355/50
[58] Field of Search .................. 355/18, 50; 352/172

[56] References Cited

U.S. PATENT DOCUMENTS

| 3,563,649 | 2/1971 | Biscow et al. | 355/50 |
| 3,756,711 | 9/1973 | Limberger | 355/50 |
| 4,174,888 | 11/1979 | Hunn et al. | 352/172 X |

Primary Examiner—Michael L. Gellner
Attorney, Agent, or Firm—Fitzpatrick, Cella, Harper & Scinto

[57] ABSTRACT

This specification discloses an apparatus for photographing originals successively on a long footage of film. Originals of various sizes such as checks, stock-certificates, vouchers, etc. are photographed on the film. When originals of various sizes are photographed on unphotographed film, how many originals can be photographed on the unphotographed film is displayed. The number of originals photographable on the unphotographed film can be known for each size of original and can also be known as the number of originals having an average size which have hitherto been photographed or as the number of originals having a minimum or a maximum size. Also, in a photographing apparatus wherein photographed film is temporally stored in a storage portion and then fed to a developing portion, how many originals can be photographed on the film that is to be stored in the storage portion is displayed.

21 Claims, 12 Drawing Figures

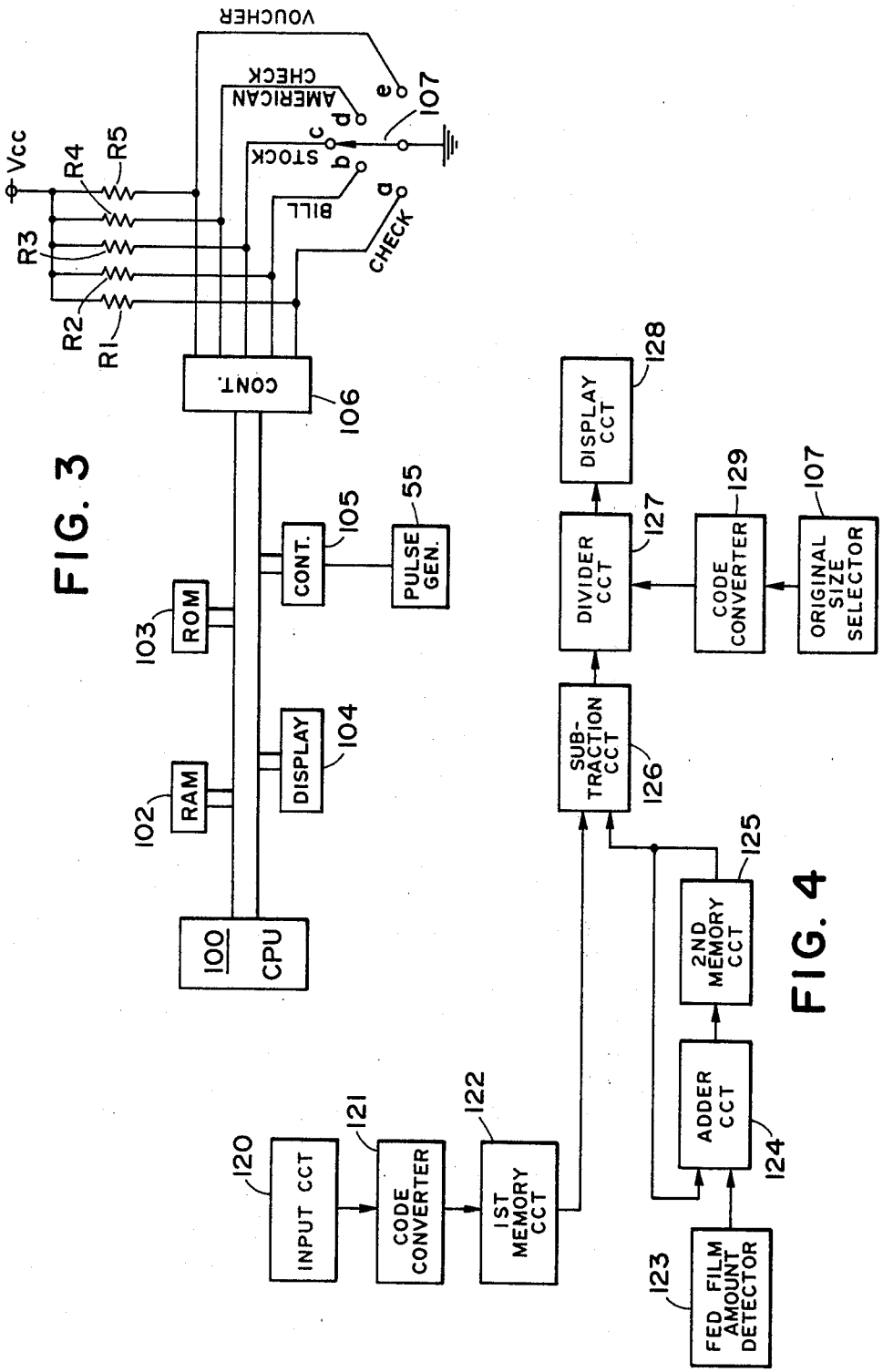

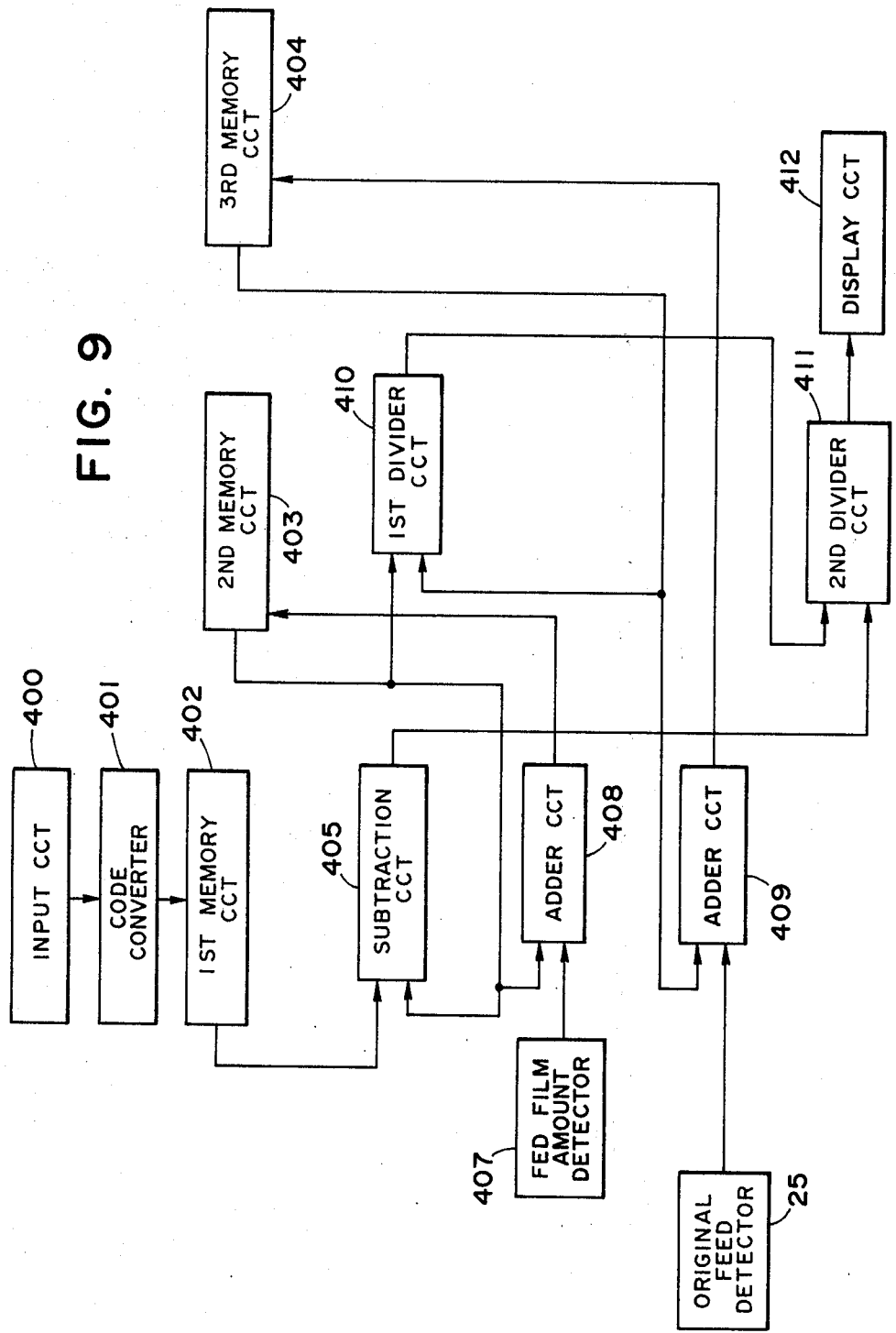

PHOTOGRAPHING APPARATUS

BACKGROUND OF THE INVENTION

1. Field of the Invention

This invention relates to a photographing apparatus for photographing originals successively on a long footage of film.

2. Description of the Prior Art

The photographing apparatus of this type has generally been designed to display the amount of unphotographed film, namely, the amount of remaining film, but with such apparatus, it has not been possible to know how many originals can be photographed on the remaining film. If the sizes of originals are constant, the amount of photographable originals can be empirically known to some extent from the amount of remaining film, but where the sizes of originals differ from one another, the amount of photographable originals cannot be known at all and therefore, whether or not the remaining originals can be photographed on a roll of film cannot be foreseen to a great inconvenience.

There is also known a photographing apparatus in which originals are successively recorded on a long footage of film and this film is temporarily accumulated in a storage chamber and then fed to a developing station.

In the photographing apparatus of this type, the film feeding speed of an exposure portion for photographing originals on the film and the film feeding speed of a developing portion for developing the photographed film differ from each other and therefore, a storage chamber is provided between these two portions so that the photographed film is temporarily accumulated in the storage chamber and then the film is continuously fed to the developing portion, thereby eliminating the inconvenience attributable to the difference between the film feeding speeds of the two portions. The size of this storage chamber is limited and when the storage chamber becomes full of film, the photographing operation of the exposure portion is inhibited and the film accumulated in the storage chamber is conveyed to the developing portion.

Where a number of originals are to be photographed, the operator cannot know the amount of film accumulated in the storage chamber and therefore cannot know how many originals can be further photographed until the storage chamber becomes full, and this has been very inconvenient. Generally, in the photographing apparatus of this type, when the storage chamber becomes full of film the film is cut at the trailing end of the final exposure section of the film and such cut strip film is continuously conveyed to the developing portion to thereby obtain a developed strip film and therefore, when the storage chamber becomes full in a case where a unit or group of originals having associated information is to be photographed, the remaining originals are photographed on separate films and to handle these films by means of a leader or the like, these films must be connected together and this means great cumbersomeness of handling after photography.

SUMMARY OF THE INVENTION

It is an object of the present invention to provide a photographing apparatus which eliminates the above-noted disadvantages.

It is another object of the present invention to display the number of originals which can be photographed on unphotographed film.

It is still another object of the present invention to display the number of originals of a desired size or an average size which can be photographed on unphotographed film to thereby enable the photographing operation to be efficiently carried out.

It is yet still another object of the present invention to display the number of originals which can be photographed on the film that is to be stored in a storage chamber for storing photographed film therein.

It is a further object of the present invention so provide a photographing apparatus in which one can know whether or not originals to be photographed can be photographed on a film.

The invention will become fully apparent from the following detailed description thereof taken in conjunction with the accompanying drawings.

BRIEF DESCRIPTION OF THE DRAWINGS

FIG. 3 is a block diagram of a display control portion.

FIG. 4 is a block diagram showing the details of the display control portion.

FIGS. 9, 10 and 11 are block diagrams showing further embodiments of the display control portion.

DESCRIPTION OF THE PREFERRED EMBODIMENTS

Figure 1:
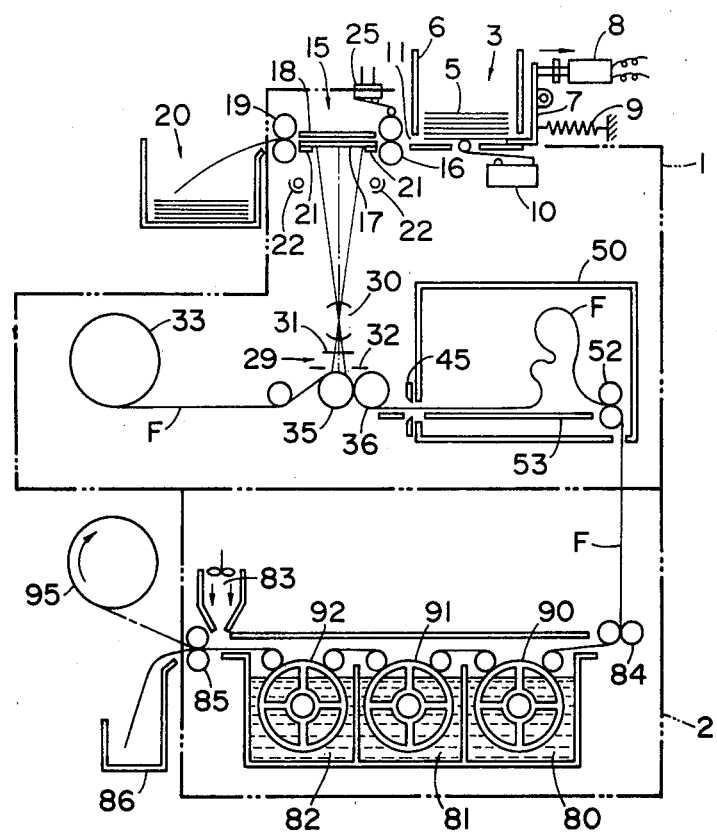
FIG. 1 is a view showing the construction of a processor camera to which the present invention is applied.

FIG. 1 shows a processor camera to which the present invention is applied. In FIG. 1, reference numeral 1 designates a camera portion for photographing originals on a photographic film, and reference numeral 2 denotes a processor portion for developing or otherwise treating photographed film.

An automatic original supply device 3 is disposed on the upper part of the camera portion 1, and originals 5 different in length such as checks, bills, stock-certificates, vouchers, etc. are piled in a container 6. The length of an original refers to the length of the original recorded on a film in the lengthwise direction of the film. Reference numeral 7 designates a rotatable lever for feeding the originals 5 out of the container, reference numeral 8 denotes an original supplying solenoid for driving the lever 7, and reference numeral 9 designates a spring coupled to one end of the lever 7. When the solenoid 8 of the automatic original supply device is energized, the lever 7 is pivotally moved against the force of the spring 9 and the tip end thereof comes into engaged with the edge of the lowermost original in the container 6, whereby an original is supplied to an illuminating portion 15.

Designated by 10 is an original detector for detecting the presence of originals in the container 6. It comprises a microswitch adapted to be closed and put out a signal of logic "1" when an original or originals are present in the container. Such signal is used as a signal for controlling the solenoid 8. The original 5 fed out of the container 6 is fed to a photographing station between two spaced apart flat glass plates 17 and 18 by a pair of feed rollers 16 disposed in the illuminating portion 15 and is photographed on a photographic film, whereafter the original is discharged into a tray 20 by a pair of discharge rollers 19.

The upper one of the pair of feed rollers 16 is supported for vertical displacement and, when an original is fed into between the pair of feed rollers 16, the upper roller is upwardly displaced by the thickness of the original and this displacement of the upper roller operates an original feed detector 25.

This detector 25 comprises a microswitch adapted to be closed and put out a signal of logic "1" when an original is fed into between the pair of feed rollers 16, and to maintain its closed position until the trailing end of the original passes the photographing station.

Reference numeral 21 designates a slit disposed near the photographing station, and reference numeral 22 denotes a lamp for illuminating the original.

The original feed rollers 16 and 19 are coupled to a drive source (not shown) and, when a main switch is closed, they are rotated at the same speed to feed an original. Reference numeral 30 designates a projection lens, reference numeral 31 denotes a shutter, and reference numeral 32 designates a slit. When it passes to the photographing station, the original 5 is projected upon a microfilm F in a photographing portion 29 by the projection lens 30 and is exposed in a slit-like form on the film.

The microfilm F comprises a known silver salt film and is held in a roll form on a supply reel 33 and guided between a capstan roller 35 and a pinch roller 36 disposed in the photographing portion 29 and into a film storage chamber 50. The capstan roller 35 is coupled to a drive source (not shown) through an electromagnetic clutch and, when the original feed detector 25 is closed, the clutch is operated so that the drive source and the roller 35 are drivingly coupled to each other and the capstan roller 35 feeds the film at a speed equal to the speed of movement of the original image on the surface of this roller.

The photographic film is not restricted to the abovedescribed one, but may be any of various sheet-like photosensitive mediums.

The capstan roller 35 is rotated so as to feed the film by a length necessary for an original to be photographed on the film, namely, the sum of the length of the original image projected upon the film and the inter-frame length of the film. The inter-frame length of the film is constant irrespective of the length of the original. Accordingly, the film is fed by a length corresponding to the length of an original for each cycle of photography and the feed amount (length) thereof differs depending on the length of the original.

Designated by 45 is a cutter for cutting the film. The cutter 45 is disposed near the entrance of the storage chamber and driven by a solenoid (not shown). The storage chamber 50 has a box-shaped space and a pair of discharge rollers 52 are disposed at the exit thereof. Exposed film is supplied into the storage chamber by the capstan roller 35. The film stored in the storage chamber is fed out of the storage chamber by the discharge rollers 52 which are rotated upon operation of a development starting switch (not shown), so that a loop F of the film is formed due to the difference in film feed amount between the capstan roller 35 and the discharge rollers 52. Designated by 53 is a film guide plate.

Figure 2:
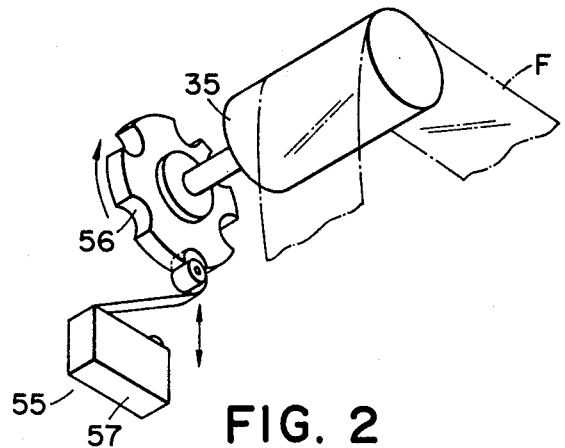
FIG. 2 is a perspective view of a pulse generator.

Referring to FIG. 2, reference numeral 55 designates a pulse generator which may be operated in response to rotation of the capstan roller 35 and generate a pulse each time the capstan roller 35 makes a predetermined angular rotation. This pulse generator 55 is comprised of a cam plate 56 fixed to the shaft of the capstan roller 35 and a microswitch 57 adapted to be closed and opened by projections provided at predetermined intervals on the periphery of the cam plate 56. It is to be noted that the pulse generator is not restricted to the above-described embodiment, but may be any of various known ones.

The discharge rollers 52 are coupled to the drive source (not shown) of the processing portion through an electromagnetic clutch so that when the electromagnetic clutch is energized, the discharge rollers 52 are rotated to feed the film from the storage chamber 50 to the processor portion at the same speed as the film feed speed of the processor portion.

The discharge rollers 52 are coupled to a second pulse generator which is similar to the first pulse generator 55. The second pulse generator may be operated in response to rotation of the discharge rollers 52 and generate a pulse each time the discharge rollers make a predetermined angular rotation. The first and second pulse generators generate the same number of pulses when the capstan roller 35 and the discharge rollers 52 have respectively fed the film by the same length.

Reference numeral 80 designates a developing device, reference numerals 81 and 82 denote washing devices, and reference numeral 83 designates a drier. The film F fed from the camera portion 1 into the processor portion 2 is fed by a drive roller 84, developed by the developing liquid in the developing device 80, washed by the washing devices 81 and 82 and dried by the warm air from the drier 83, whereafter the film F is discharged into a tray 86 by discharge rollers 85. Feed drums 90, 91 and 92 are disposed in the liquid tanks of the developing device 80 and washing devices 81, 82, respectively, and the film F is fed while being wound on each of these drums. A single bath developing-fixing liquid is employed as the developing liquid in the developing device 80. Alternatively, use may be made of a two-bath developing-fixing treatment in which the developing treatment and the fixing treatment are carried out in individual tanks. The feed rollers 84, the discharge rollers 85 and the drums 90, 91, 92 are driven by the same drive source (not shown) and feed the film at the same speed.

Designated by 95 is a take-up reel used to take up the film. In the present embodiment, it is to be understood that the film feeding speed of the processor portion is higher than the film feeding speed of the camera portion. Alternatively, the film feeding speeds of the two portions may be equal to each other or the film feeding speed of the camera portion may be higher than the film feeding speed of the processor portion.

FIG. 3 shows the photographable sheet number display portion of the above-described processor camera.

FIG. 3 includes a central operational unit (hereinafter referred to as CPU) 100, a temporary memory device (hereinafter referred to as RAM) 102, a fixed memory device (hereinafter referred to as ROM) 103, a display device 104, input and output control portions 105 and 106, and an original size selector switch 107. The amount A of unphotographed film wound on a supply reel 33 is stored in the ROM 103. Usually, commercially available film is prewound on a reel and the length of such film is 30.5 m and this length is stored in the ROM 103. In the case of thin film, a film as long as 65.5 m is wound on a reel and in such case, the memory content of the ROM 103 is changed in advance. The pulses generated by the pulse generator 55 in response to the film feed of an exposure portion are counted by the counter portion of the CPU 100 and the count by the counter portion is stored in the RAM 102. The stored value in the RAM 102 corresponds to the amount B of photographed film. The amount of film necessary to photographed an original differs depending on the size of the original (the length of the original in the direction in which it is conveyed), and the film feed amounts necessary to photograph originals of respective sizes are stored in the ROM 103. The film feed amount necessary to photograph an original corresponds to the sum of the length of the original on the film surface and the interframe length.

In the above-described processor camera, each time an original is fed to the photographing station, the film F is fed by a predetermined length corresponds to the size of the original and photographed film is fed into the storage chamber 50. The pulses generated with the feed of the film are counted by the counter portion of the CPU 100 and the amount B of photographed film is stored in the RAM 102. The difference between the set film amount A stored in the ROM 103 and the amount B of photographed film stored in the RAM 102 is calculated by the subtracting portion of the CPU 100 and the value C of the difference is stored in the RAM 102. In the divider portion of the CPU 100, the subtraction value C stored in the RAM 102 is divided by the stored value in the ROM 103 which stores the fed film amount necessary to photograph an original selected by the selector switch 7, and the divisional value is displayed by a display device 104. That is, the display device 104 displays the number of originals which can be photographed on the unphotographed film, namely, the film remaining on the supply reel. The operator can efficiently carry out the photographing operation while seeing the display content of the display device.

When the film on the supply reel becomes exhausted, the display on the display device 104 becomes "0" and supply of originals is stopped and the photographing operation is inhibited. Next, when a development starting button is operated, the discharge rollers 52 are rotated and the film in the storage chamber is fed therefrom to the developing portion. On the other hand, when the development starting switch has been operated, the capstan roller 35 is rotated to idly feed the film and when the trailing end of the final exposure section of the film has passed the cutting station of the cutter 45, the capstan roller 35 is stopped from rotating, and then the cutter 45 is operated to cut the film. The cut film is continuously developed and the developed film is transported to the tray 86 or the take-up reel 95. Accordingly, from the display content of the display device 104, the operator can know whether or not a unit of group of originals to be newly photographed can be photographed on a strip film, whereby preventing a unit of group of originals from being recorded on discrete strip films. Also, where the size of the original to be photographed is changed in the course of photography, if the switch 107 is changed over, the number of originals of a selected size which can be photographed on unphotographed film will immediately be displayed.

The development starting switch may also be operated before the storage chamber becomes full and in such case, there will be obtained a strip film short in length. Also, originals may be manually supplied instead of being automatically supplied. In the above-described embodiment, only one display device is provided, but alternatively, a plurality of display devices may be provided so that the number of photographable originals may be displayed correspondingly to the size of each original.

FIG. 4 shows the details of the display control portion shown in FIG. 3. In FIG. 4, reference numeral 120 designates an input circuit for entering the length A of the film mounted on the supply reel, and reference numeral 121 denotes a code converter circuit for code-converting the entered length of the film. In the present embodiment, the code converter circuit 121 code-converts the film of the entered length into a pulse number generated by the pulse generator 55 when such film has been fed by the capstan roller 35. Reference numeral 122 designates a first memory circuit for storing the pulse number code-converted by the code converter circuit, namely, the entered length A of the film, reference numeral 123 denotes a fed film amount detector, reference numeral 124 designates an adder circuit for measuring the length of photographed film, reference numeral 125 denotes a second memory circuit for storing therein the length B of photographed film, reference numeral 126 designates a subtraction circuit for measuring the length of unphotographed film, reference numeral 127 denotes a divider circuit for calculating the number of originals which can be photographed on unphotographed film, reference numeral 128 designates a display circuit, and reference numeral 129 denotes a code converter circuit for code-converting the length of an original selected by the aforementioned original size selector switch 107. The fed film amount detector 123 measures the length of film fed when an original is photographed to detect the length of film necessary to photograph an original, and indicates a measurement value corresponding to the length of the original. This detector transfers the measurement value to the adder circuit 124 after an original has been photographed, and is reset after the transfer.

The adder circuit 124 calculates the sum of the length of photographed film stored in the second memory circuit 125 and the length of film measured by the detector 123, and transfers the value of the sum to the second memory circuit 125. When the value of the sum in the adder circuit 124 is transferred to the second memory circuit 125, the second memory circuit 125 clears the hitherto stored memory content and stores this value of the sum therein. Accordingly, the length B of film hitherto photographed is stored in the second memory circuit 125. Next, when a new original is photographed, the memory content of the second memory circuit is varied in the same manner as that previously described. The subtraction circuit 126 calculates the difference between the length A of film stored in the first memory circuit 122 and the length B of photographed film stored in the second memory circuit 125, and the subtraction value of the subtraction circuit 126 represents the length C of unphotographed film remaining short of the photographing portion 29 and this value is sent to the divider circuit 127.

The code converter circuit 129 code-converts the length of an original selected by the original size selector switch 107 into a pulse number generated by the pulse generator 55 when film of a length necessary to photograph the original selected by the original size selector switch 107 (corresponding to the sum of the length of the original image on the film and the interframe length) has been fed by the capstan roller 35. The divider circuit 127 divides the length C of unphotographed film calculated by the subtraction circuit 126 by the length of film code-inverted by the code inverter circuit 129, and the divisional value thereof represents the number of originals of a selected size which can be photographed on unphotographed film. The divisional value of the divider circuit 127 is displayed as the number of originals in the display circuit 128.

The first and second memory circuits 122 and 125 hold their memories irrespective of ON-OFF of the power switch, and are reset during film interchange so that their memory contents are cleared.

Figure 5:
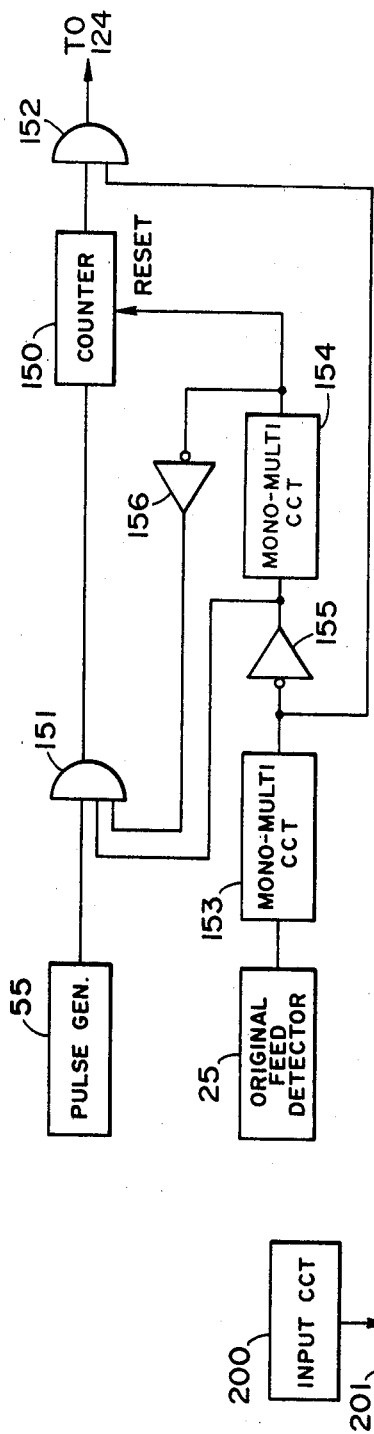
FIG. 5 is a block diagram showing an embodiment of the fed film amount detector.

FIG. 5 shows an example of the fed film amount detector which measures the fed film amount by converting it into a pulse number.

In FIG. 5, reference numeral 150 designates a counter for counting the pulses generated by the pulse generator 55, reference numerals 151 and 152 denote AND gates, reference numerals 153 and 154 designate mono-multi circuits, and reference numerals 155 and 156 denote inverters. The mono-multi circuit 154 puts out a control signal of short pulse when the original feed detector 25 detects an original. The mono-multi circuit 154 puts out a control signal of short pulse when the mono-multi ciucuit 153 no longer puts out its control signal, and is reset by this output signal. The counter 150 is reset by the output signal of the mono-multi circuit 154 immediately after the original feed detector 25 has detected an original and, as soon as the counter 150 is reset, the AND gate 151 opens and the pulses of the pulse generator 55 are counted by the counter 150. When an original has been photographed, the pulse generator 55 no longer puts out pulses. Accordingly, in the counter 150, a pulse number corresponding to the length of film necessary to photograph an original is counted. Next, when a new original is fed to the illuminating portion 15, the AND gate 152 is opened by the control signal put out from the mono-multi circuit 153 when the original feed detector 25 has detected this original, and the count by the counter 150 is sent to the adder circuit 124. Immediately after the count by the counter 150 has been so sent, the counter 150 is reset and starts to count the pulses generated by the pulse generator 55 when this new original is photographed. As a result, the counter 150 counts a pulse number corresponding to the length of fed film each time an original is photographed.

Description will now be made of a case where the number of originals which can be photographed on a film that is to be accumulated in the storage chamber 50 is displayed.

In FIG. 3, the amount D of film that can be accumulated in the storage chamber is stored in the ROM 103. The pulses generated by the first pulse generator 55 in response to the feed to the film in the exposure portion is counted by the counter portion of the CPU 100, and the count by the counter portion is stored in the RAM 102. The stored value in the RAM 102 corresponds to the amount E of photographed film supplied into the storage chamber 50. The amount of film necessary to photograph an original differs depending on the size of the original (the length of the original in the direction in which it is conveyed), and the fed film amount necessary to photograph an original of each size is stored in the ROM 103.

In the above-described processor camera, each time an original is fed to the photographing station, the film F is fed by a predetermined length corresponding to the size of the original and photographed film is fed into the storage chamber 50. The pulses generated with the feed of the film are counted by the counter portion of the CPU 100 and the amount E of film accumulated in the storage chamber is stored in the RAM 102. The difference between the amount D of film stored in the ROM 103 and the amount E of film stored in the RAM 102 is calculated by the subtracting portion of the CPU 100 and the value F of the difference is stored in the RAM 102. In the divider portion of the CPU 100, the value F of the difference stored in the RAM 102 is divided by the stored value in the ROM 103 which stores the amount of film necessary to photograph an original selected by the selector switch 107, and the divisional value is displayed by the display device. That is, the display device 104 displays the number of originals which can be photographed until the storage chamber becomes full of film. The operator can efficiently carry out the photographing operation while seeing the display content of the display device.

When the storage chamber 50 becomes full of film, the display of the display device 104 becomes "0", whereupon supply of originals is stopped and the photographing operation is inhibited. Next, when the development starting button is operated, the discharge rollers 52 are rotated and the film in the storage chamber is fed therefrom to the developing portion. On the other hand, when the development starting switch has been operated, the capstan roller 35 is rotated to idly feed the film and, when the trailing end of the final exposure section of the film has passed the cutting station of the cutter 45, the capstan roller 35 is stopped from rotating, and then the cutter 45 is operated to cut the film. The cut film is continuously developed and the developed film is transported to the tray 86 or the take-up reel 95. Accordingly, from the display content of the display device 104, the operator can know whether or not a unit of group of originals can be photographed on a strip film, whereby preventing a unit of group of originals from being recorded on discrete strip films. Also, where the size of the original to be photographed is changed in the course of photography, if the switch 107 is changed over, the number of photographable originals will immediately be displayed.

Figure 6:
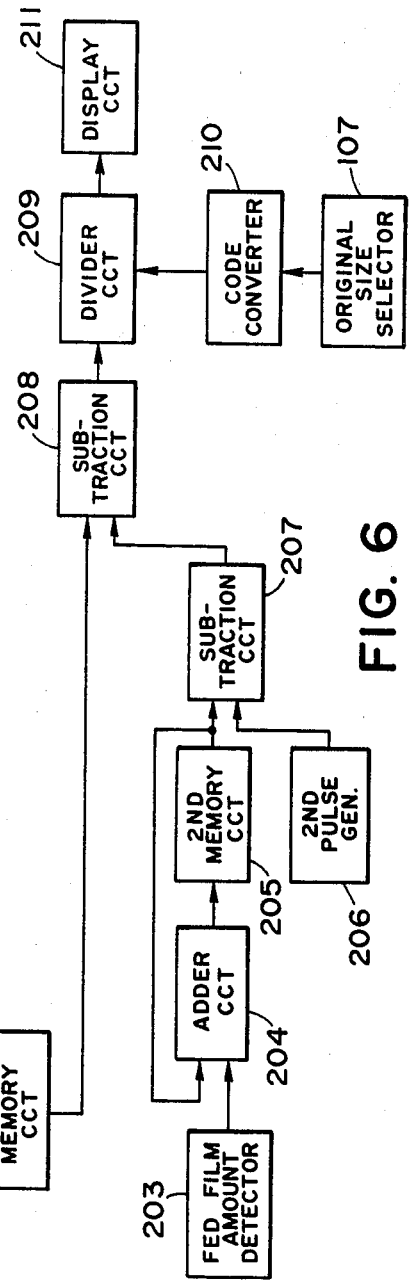
FIG. 6 is a block diagram showing another embodiment of the display control portion.

FIG. 6 shows the details of a display control portion for displaying the number of originals which can be photographed on a film that is to be stored in the storage chamber 50. In FIG. 6, reference numeral 200 designates an input circuit for entering the length D of film that can be stored in the storage chamber 50 when the storage chamber 50 is empty, and reference numeral 201 denotes a code converter circuit for code-converting the entered length of film. In the present embodiment, the code converter circuit 201 code-converts the entered length of film into a pulse number generated by the pulse generator 55 when the entered length of film has been fed by the capstan roller 35. Reference numeral 202 designates a first memory circuit for storing therein the pulse number code-converted by the code converter circuit 201, namely, the entered length D of film, reference numeral 203 denotes the fed film amount detector shown in FIG. 5, reference numeral 204 designates an adder circuit for measuring the length of photographed film, namely the length of photographed film fed into the storage chamber, reference numeral 205 denotes a second memory circuit for storing therein the length of photographed film fed into the storage chamber 50, reference numeral 206 designates the aforementioned second pulse generator, reference numerals 207 and 208 denote subtraction circuits, reference numeral 209 designates a divider circuit for calculating the number of originals which can be photographed on a film that is to be stored in the storage chamber, reference numeral 210 denotes a code converter circuit for code-converting the length of an original selected by the aforementioned original size selector switch 107, and reference numeral 211 denotes a display circuit.

The detector 203 measures the length of film fed when an original is photographed to detect the length of film necessary to photograph an original as previously described, and indicates a measurement value corresponding to the length of the original. This detector transfers the measurement value to the adder circuit 204 after an original has been photographed, and is reset after the transfer. The adder circuit 204 measures the length of photographed film and calculates the sum of the length of photographed film stored in the second memory circuit 205 and the length of film measured by the detector 203, and transfers the value of the sum to the second memory circuit 205. When the value of the sum in the adder circuit 204 is sent to the second memory circuit 205, the second memory circuit 205 clears the content hitherto stored therein and stores this value of the sum therein. Accordingly, the length B of photographed film transported into the storage chamber is stored in the second memory circuit 205. Next, when a new original is photographed, the stored content in the second memory circuit is varied as previously described.

The subtraction circuit 207 calculates the difference between the length B of photographed film stored in the second memory circuit 205 and the pulse number generated by the second pulse generator 206, namely, the length of film discharged from the storage chamber 50. The subtraction value E of the subtraction circuit 207 represents the length of film stored in the storage chamber 50. It is to be noted that when the film is not discharged from the storage chamber 50 during photography, B=E.

The subtraction circuit 208 calculates the difference between the amount D of film stored in the first memory circuit 202 and the subtraction value E of the subtraction circuit 207, and the subtraction value F of the subtraction circuit 208 represents the length of film that is to be stored in the storage chamber, and this value is sent to the divider circuit 209.

The code converter circuit 210 code-converts the length of film necessary to photograph an original selected by the original size selector switch 107 into a pulse number generated by the pulse generator 55 when such length of film has been fed by the capstan roller 35. The divider circuit 209 divides the length F of film calculated by the subtraction circuit 208 by the length of film code-converted by the code converter circuit 210, and the divisional value thereof represents the number of selected originals which can be photographed on the film that is to be stored in the storage chamber. The divisional value of the divider circuit 209 is displayed as the number of originals in the display circuit 211. The first and second memory circuits 202 and 205 hold their memories irrespective of ON-OFF of the power switch. The second memory circuit 205 is reset by operation of the development starting button or operation of the cutter 45 so that the stored content therein is cleared.

In the above-described embodiment, only one display device is provided, but a plurality of display devices may be provided so that the number of originals may be displayed for each size of original.

Figure 7:
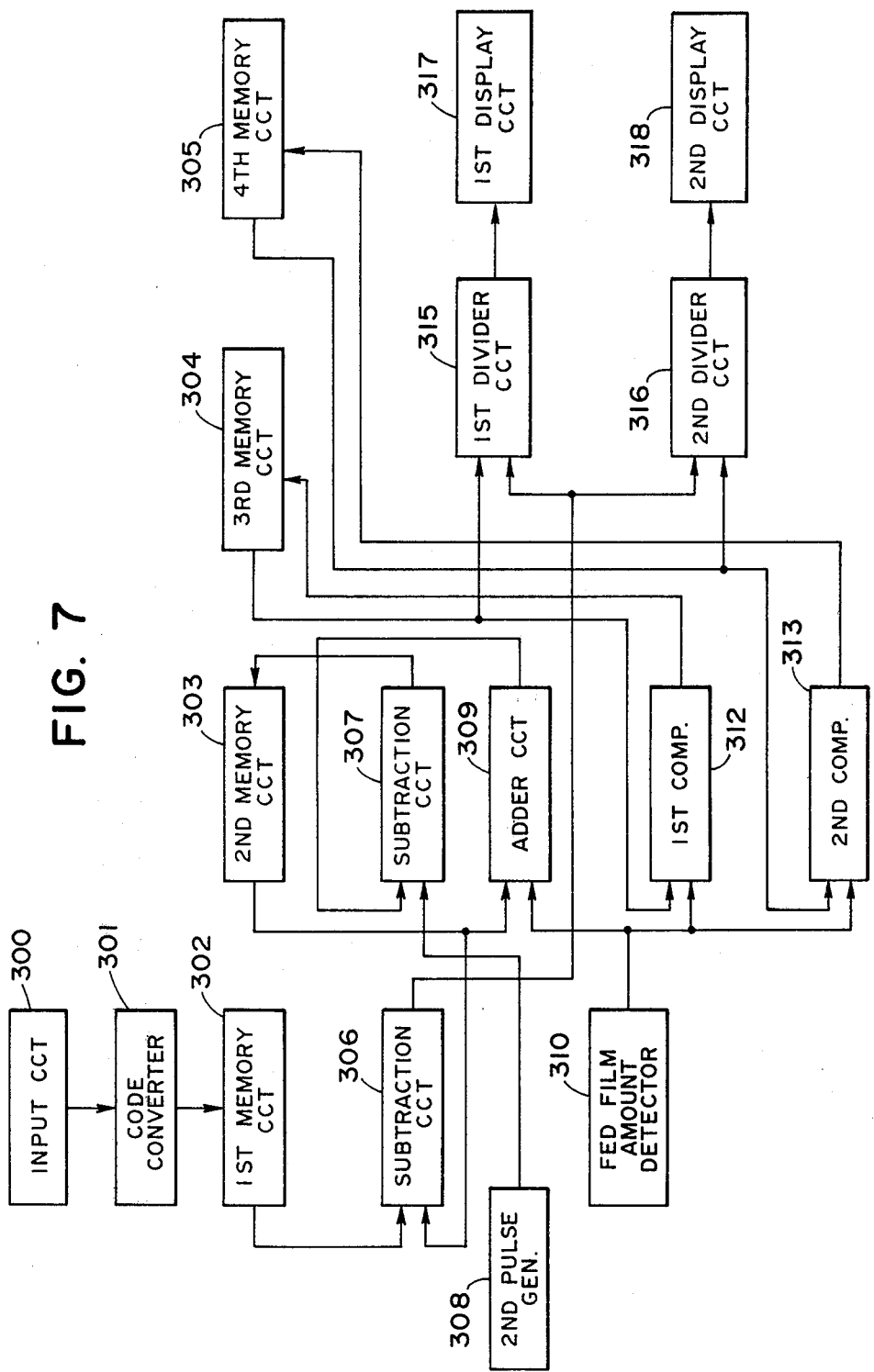
FIG. 7 is a block diagram showing still another embodiment of the display control portion.

FIG. 7 shows still another embodiment of the display control portion. In FIG. 7, reference numeral 300 designates an input circuit for entering the length D of film which can be stored in the storage chamber 50, and reference numeral 301 denotes a code converter circuit for code-converting the entered length of film. In the present embodiment, the code converter circuit code-converts the entered length of film into a pulse number generated by the pulse generator 55 when such length of film has been fed by the capstan roller 35. Reference numeral 302 designates a first memory circuit for storing therein the pulse number code-converted by the code converter circuit 301, namely, the entered length of film, reference numeral 303 denotes a second memory circuit for storing therein the length E of film stored in the storage chamber 50, reference numeral 304 designates a third memory circuit for storing therein the length of film necessary to photograph an original having a maximum length which has been photographed, and reference numeral 305 denotes a fourth memory circuit for storing therein the length of film necessary to photograph an original having a minimum length which has been photographed.

Reference numerals 306 and 307 designate subtraction circuits, reference numeral 308 denotes the aforementioned second pulse generator, reference numeral 309 designates an adder circuit for measuring the length of photographed film, and reference numeral 310 denotes the fed film amount detector shown in FIG. 5. The detector 310 measures the length of film fed when an original is photographed, and indicates a measurement value corresponding to the length of the original. This detector transfers the measurement value after an original has been photographed, and is reset after the transfer.

The subtraction circuit 307 calculates the difference between the length E of film stored in the second memory circuit 303 and the pulse number generated by the second pulse generator 308, namely, the length of film discharged from the storage chamber 50, and transfers this subtraction value to the second memory circuit 303. When the subtraction value of the subtraction circuit 307 is sent to the second memory circuit 303, the second memory circuit clears the content hitherto stored therein and stores this subtraction value therein. Accordingly, the length E of film now stored in the storage chamber 50 is stored in the second memory circuit.

When a new original is photographed and the film is discharged from the storage chamber, the stored content in the second memory circuit is varied.

The adder circuit 309 calculates the sum of the length E of film stored in the second memory circuit 303 and the length of film measured by the detector 310, and seconds the value of the sum to the subtraction circuit 307.

Designated by 312 is a first comparator circuit which compares the length of the original on the film having a maximum length stored in the third memory circuit 304 with the length of film measured by the detector 310 and which transfers the length of film of the detector 310 to the third memory circuit 304 only when the length of film of the detector 310 is greater than the length of film necessary to photograph the original having a maximum length stored in the third memory circuit 304. When the length of film of the detector 310 is transferred to the third memory circuit, the third memory circuit clears the content hitherto stored therein, and stores therein the measurement value of the detector. Accordingly, the length of film necessary to photograph the original having a maximum length which has hitherto been photographed is stored in the third memory circuit 304. Thereafter, when an original having a greater length is photographed, the stored content in the third memory circuit is varied as previously described. The first comparator circuit 312 is reset after it has terminated the comparison.

Designated by 313 is a second comparator circuit which compares the length of film stored in the fourth memory circuit 305 with the length of film fed from the detector 310 and which transfers the length of film of the detector 310 to the fourth memory circuit only when the length of film of the detector 310 is smaller than the length of film stored in the fourth memory circuit 305. When the length of film of the detector 310 is transferred to the fourth memory circuit, the fourth memory circuit clears the content hitherto stored therein and stores the measurement value of the detector therein. Accordingly, the length of film necessary to photograph an original having a minimum length which has hitherto been photographed is stored in the fourth memory circuit 305. Thereafter, when an original having a shorter length is photographed, the stored content in the fourth memory circuit is varied as previously described. The second comparator circuit 313 is reset after it has terminated the comparison. It is to be noted that the detector 310 measures the length of film fed when an original is photographed, and the measured length of film corresponds to the sum of the length of the original image on the film and the inter-frame length of the film.

In the above-described embodiment, photography is carried out by the slit exposure system, but alternatively, photography may be carried out by the whole surface simultaneous exposure system with the original and the film maintained stationary and in this latter case, the film is fed by a predetermined amount after an original has been photographed.

The subtraction circuit 306 calculates the difference between the length D of film stored in the first memory circuit 302 and the length E of film stored in the second memory circuit 303, and the subtraction value F of the subtraction circuit 306 represents the length of film that is to be stored in the storage chamber, and this value is sent to the first divider circuit 315 and the second divider circuit 316. The first divider circuit 315 divides the length of film calculated by the subtraction circuit 306 by the length of film stored in the third memory circuit 304, and the divisional value thereof represents the number of originals having a maximum length which can be photographed on the film that is to be stored in the storage chamber. The divisional value of the first divider circuit 315 is displayed by the first display circuit 317. The second divider circuit 316 divides the length of film calculated by the subtraction circuit 306 by the length of film stored in the fourth memory circuit 305, and the divisional value thereof represents the number of originals having a minimum length which can be photographed on the film that is to be stored in the storage chamber. The divisional value of the second divider circuit 316 is displayed by the second display circuit 318. Accordingly, when the storage chamber becomes full of photographed film, the display contents of the first and second display devices 317 and 318 becomes "0". At this time, the photographing operation is inhibited. The second, third and fourth memory circuits 303, 304 and 305 are reset by operation of the development starting button or operation of the cutter 45 so that their stored contents are cleared. The first to fourth memory circuits 202-205 hold their memories irrespective ON-OFF of the power switch.

Thus, in the diaply circuits 317 and 318, the number of originals having a maximum length or a minimum length that are to be photographed until the storage chamber becomes full of film is displayed. Accordingly, the operator, by seeing the display contents of the display devices, can judge whether or not the originals to be photographed can be photographed on a film and therefore, associated originals can be recorded on the same film and thus, the recorded film becomes simple to handle and this eliminates the necessity of editing the film by connecting films together as has heretofore been done.

Figure 8:
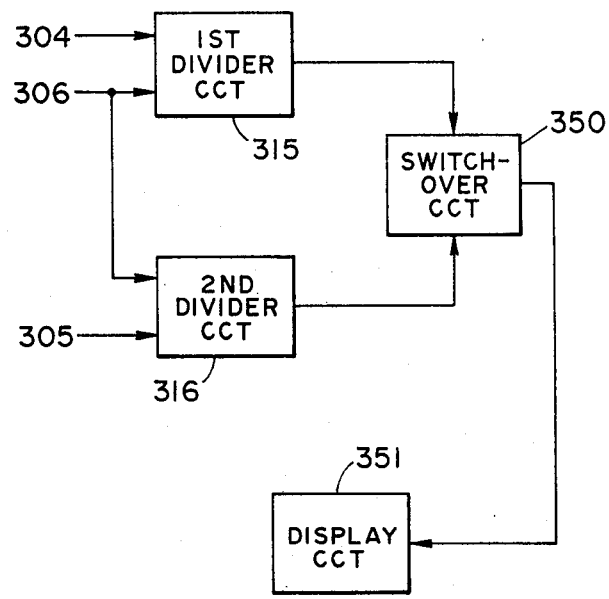
FIG. 8 shows another embodiment of the display device.

FIG. 8 shows another embodiment of the display device. In FIG. 8, reference numeral 350 designates a switchover circuit, and reference numeral 351 denotes a display circuit. The display circuit 351 alternately displays the divisional value of the first divider circuit 315 and the divisional value of the second divider circuit 316 through the operation of the switchover circuit 350.

Figure 10:
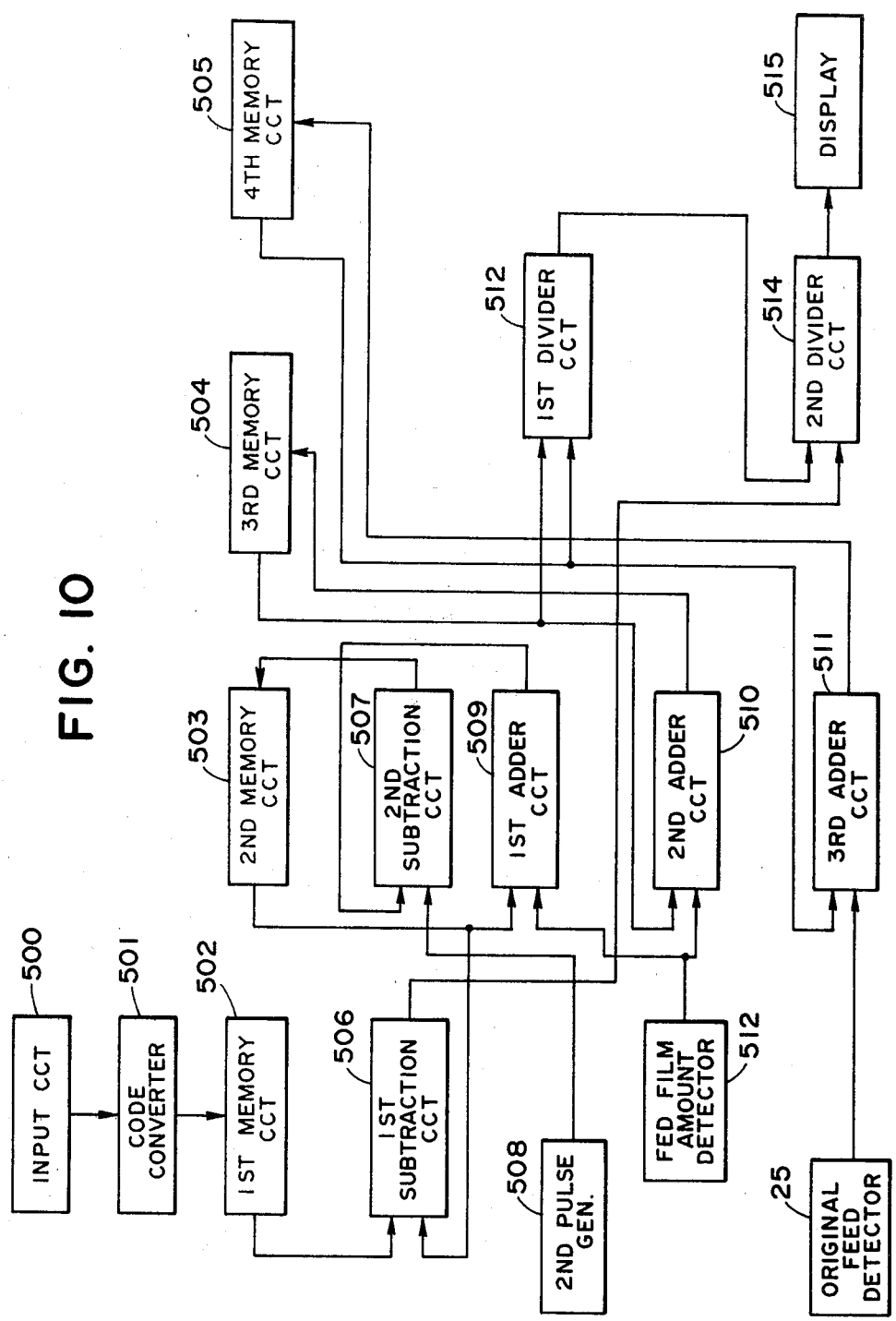
Figure 11:
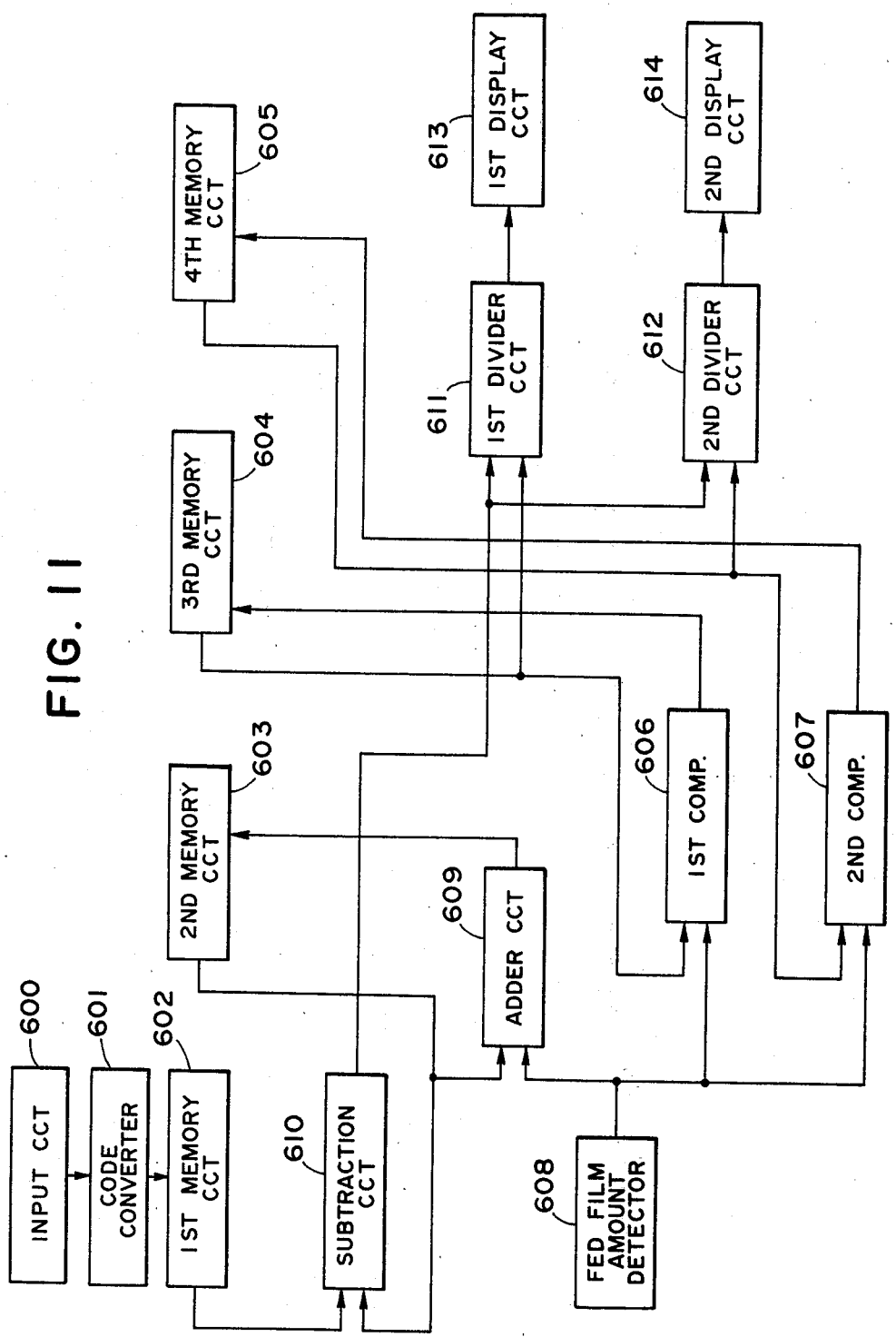

FIGS. 9 to 11 show further embodiments of the display control portion.

In FIG. 9, reference numeral 400 designates an input circuit for entering the length A of film mounted on the supply reel 33, and reference numeral 401 denotes a code converter circuit for code-converting the entered length A of film. In the present embodiment, the code converter circuit 401 code-converts the entered length of film into a pulse number generated by the pulse generator 55 when said length of film has been fed by the capstan roller 35. Reference numeral 402 designates a first memory circuit for storing therein the pulse number code-converted by the code converter circuit 401, namely, the entered length A of film, reference numeral 403 denotes a second memory circuit for storing therein the length B of photographed film, reference numeral 404 designates a third memory circuit for storing therein the number of photographed originals, reference numeral 405 denotes a subtraction circuit, reference numeral 407 designates the fed film amount detector shown in FIG. 5, reference numerals 408 and 409 denote adder circuits, reference numeral 410 designates a first divider circuit, and reference numeral 411 denotes a second divider circuit. The fed film amount detector 407 measures the length of film fed when an original is photographed, and indicates a measurement value corresponding to the length of the original. This detector transfers the measurement value after an original has been photographed, and is reset after the transfer.

The adder circuit 408 calculates the sum of the length B of photographed film stored in the second memory circuit 403 and the length of film measured by the detector 407, and transfers the value of this sum to the second memory circuit 403.

When the addition value of the adder circuit 408 is sent to the second memory circuit 403, the second memory circuit clears the content hitherto stored therein and stores this addition value therein. Accordingly, the length of film hitherto photographed is stored in the second memory circuit.

Next, when a new original is photographed, the stored content in the second memory circuit is varied as previously described. The adder circuit 408 is reset after it has transferred the addition value to the second memory circuit 403.

The subtraction circuit 405 calculates the difference between the length A of film stored in the first memory circuit 402 and the length B of photographed film stored in the second memory circuit 403, and the subtraction value C of the subtraction circuit 405 represents the length of unphotographed film remaining short of the photographing portion 29, and this value is sent to the second divider circuit 411.

The adder circuit 409 calculates the sum of the original detection signal of the original feed detector 25 and the number of photographed originals stored in the third memory circuit 404, and transfers the value of this sum to the third memory circuit 404. When the addition value of the adder circuit 409 is sent to the third memory circuit, the third memory circuit clears the content hitherto stored therein and stores this addition value therein. Accordingly, the number of originals hitherto photographed is stored in the third memory circuit 404.

The first divider circuit 410 divides the length of photographed film stored in the second memory circuit 403 by the number of photographed originals stored in the third memory circuit 404, and the divisional value thereof represents the length of film necessary to photograph an original having an average length which has hitherto been photographed.

The second divider circuit 411 divides the length C of unphotographed film calculated by the subtraction circuit 405 by the length of film calculated by the first divider circuit 410, and the divisional value thereof represents the number of originals having an average length which can be photographed on unphotographed film.

The divisional value of the second divider circuit 411 is displayed by the display circuit 412. The third memory circuit 404 is reset by operation of the development starting button or operation of the cutter 45 so that the stored content therein is cleared.

The first and second memory circuits 402 and 403 hold their memories irrespective of ON-OFF of the powder switch.

The detector 407 measures the length of film fed when an original is photographed, and the measured length of film represents the length of film necessary to photograph the original and corresponds to the sum of the length of the original image on the film and the inter-frame length on the film. Accordingly, the length of film necessary to photograph an original having an average length corresponds to the length of film fed when an average original is photographed.

Thus, the display device displays the number of originals having an average length which can be photographed on unphotographed film, namely, the film remaining on the supply reel. By seeing the display content of the display device and from the average of the lengths of the originals hitherto photographed, the operator can judge whether or not originals having different lengths that are to be photographed can be photographed on a film and as a result, he can photograph associated originals on a film, thus efficiently carrying out the photographing operation.

In FIG. 10, reference numeral 500 designates an input circuit for entering the length D of film which can be stored in the storage chamber 50, and reference numeral 501 denotes a code converter circuit for code-converting the entered length of film. In the present embodiment, the code converter circuit 501 code-converts the entered length of film into a pulse number generated by the pulse generator 55 when the entered length of film has been fed by the capstan roller 35. Reference numeral 502 designates a first memory circuit for storing therein the pulse number code-converted by the code converter circuit 201, namely, the entered length of film, reference numeral 503 denotes a second memory circuit for storing therein the length E of film stored in the storage chamber 50, reference numeral 504 designates a third memory circuit for storing therein the length B of photographed film, and reference numeral 505 denotes a fourth memory circuit for storing therein the number of photographed originals. Reference numbers 506 and 507 designate subtraction circuits, reference numeral 508 denotes the aforementioned second pulse generator, reference numerals 509, 510 and 511 designate adder circuits, reference numeral 512 denotes the fed film amount detector shown in FIG. 5, reference numerals 512 and 513 denote divider circuits, and reference numeral 514 designates a display circuit. The detector 512 measures the length of film fed when an original is photographed, and indicates a measurement value corresponding to the length of the original. This detector transfers the measurement value after an original has been photographed, and is reset after the transfer. The first subtraction circuit 506 calculates the difference between the length D of film stored in the first memory circuit 502 and the length E of film stored in the second memory circuit 503, and the subtraction value F of the subtraction circuit 506 represents the length of film that is to be stored in the storage chamber, and this value is sent to the second divider circuit 513. The second subtraction circuit 507 calculates the difference between the length E of film stored in the second memory circuit 503 and the pulse number generated by the second pulse generator 508, namely, the length of film discharged from the storage chamber 50, and transfers this subtraction value to the second memory circuit 503. When the subtraction value of the second subtraction circuit 507 is sent to the second memory circuit 503, the second memory circuit clears the content hitherto stored therein and stores this subtraction value therein. Accordingly, the length E of film stored in the storage chamber 50 is stored in the second memory circuit. When a new original is photographed and the film is discharged from the storage chamber, the stored content in the second memory circuit is varied. The first adder circuit 509 calculates the sum of the length E of film stored in the second memory circuit 503 and the length of film measured by the detector 512, and sends the value of the sum to the second subtraction circuit 507. The second adder circuit 510 calculates the sum of the length B of photographed film stored in the third memory circuit 504 and the length of film measured by the detector 512, and transfers the value of the sum to the third memory circuit 504. When the addition value of the second adder circuit 510 is sent to the third memory circuit 504, the third memory circuit clears the content hitherto stored therein and stores this addition value therein. Accordingly, the length of film hitherto photographed is stored in the third memory circuit.

Next, when a new original is photographed, the stored content in the third memory circuit is varied as previously described. The second adder circuit 510 is reset after it has transferred the addition value thereof to the third memory circuit 504. The third adder circuit 511 calculates the sum of the original detection signal of the original feed detector 25 and the number of photographed originals stored in the fourth memory circuit 505, and transfers this addition value to the fourth memory circuit 505. When the addition value of the adder circuit 511 is sent to the fourth memory circuit, the fourth memory circuit clears the content hitherto stored therein and stores this addition value therein. Accordingly, the number of originals hitherto photographed is stored in the fourth memory circuit 505. The first divider circuit 512 divides the length of photographed film stored in the third memory circuit 504 by the number of photographed originals stored in the fourth memory circuit 505, and the divisional value thereof represents the length of film necessary to photograph an original having an average length which has hitherto been photographed. The second divider circuit 513 divides the length of film calculated by the first subtraction circuit 506 by the length of film calculated by the first divider circuit 512, and the divisional value thereof represents the number of originals having an average length which can be photographed on the film that is to be stored in the storage chamber. The divisional value of the second divider circuit 513 is displayed by the display circuit 514. The second, third and fourth memory circuits 503, 504 and 505 are reset by operation of the development starting button or operation of the cutter 45 so that the stored contents therein are cleared. The memory circuits 502-505 hold their memories irrespective of ON-OFF of the power switch. When the storage chamber 50 becomes full of photographed film, the display content of the display circuit 514 becomes "0". At this time, photographing operation is inhibited.

Thus, the display device displays the number of originals having an average length which can be photographed on the film that is to be stored in the storage chamber. Accordingly, by seeing the display content of the display device, the operator can judge whether or not the originals to be photographed can be photographed on a film and therefore, associated originals can be recorded on the same film and thus, the recorded film becomes simple to handle and this eliminates the necessity of editing the film by connecting films together as has heretofore been done.

In FIG. 11, reference numeral 600 designates an input circuit for entering the length A of film mounted on the supply reel 33, and reference numeral 601 denotes a code converter circuit for code-converting the entered length of film. In the present embodiment, the code converter circuit 601 code-converts the entered length of film into a pulse number generated by the pulse generator 55 when the entered length of film has been fed by the capstan roller 35. Reference numeral 602 designates a first memory circuit for storing therein the pulse number code-converted by the code converter circuit 601, namely, the entered length of film, reference numeral 603 denotes a second memory circuit for storing therein the length of photographed film, and reference numeral 604 designates a third memory circuit for storing therein the length of film necessary to photograph an original having a maximum length that has been photographed. Reference numeral 608 denotes the fed film amount detector shown in FIG. 5 which measures the length of film fed when an original has been photographed and which indicates a measurement value corresponding to the length of the original. This detector transfers the measurement value after an original has been photographed, and is reset after the transfer.

Reference numeral 609 designates an adder circuit which calculates the sum of the length of photographed film stored in the second memory circuit 603 and the length of film measured by the detector 608 and transfers the value of the sum to the second memory circuit 603. When the addition value of the adder circuit 609 is sent to the second memory circuit 603, the second memory circuit clears the content hitherto stored therein and stores this addition value therein. Accordingly, the length of film hitherto photographed is stored in the second memory circuit.

Next, when a new original is photographed, the stored content in the second memory circuit is varied as previously described. The adder circuit 609 is reset after it has transferred the addition value to the second memory circuit 603.

Reference numeral 606 designates a first comparator circuit which compares the length of the original on the film having a maximum length stored in the third memory circuit 604 with the length of film measured by the detector 608 and transfers the length of film of the detector 608 to the third memory circuit 604 only when the length of film of the detector 608 is greater than the length of the original having a maximum length stored in the third memory circuit 604. When the length of film of the detector 608 is sent to the third memory circuit, the third memory circuit clears the content hitherto therein and stores the measurement value of the detector therein. Accordingly, the length of film necessary to photograph an original having a maximum length that has hitherto been photographed is stored in the third memory circuit 604. Thereafter, when a longer original is photographed, the stored content in the third memory circuit is varied as previously described. The first comparator circuit 606 is reset after it has terminated the comparison.

Reference numeral 607 denotes a second comparator circuit when campares the length of film stored in the fourth memory circuit 605 with the length of film fed from the detector 608 and transfers the length of film of the detector 608 to the fourth memory circuit only when the length of film of the detector 608 is smaller than the length of film stored in the fourth memory circuit 605. When the length of film of the detector 698 is sent to the fourth memory circuit, the fourth memory circuit clears the content hitherto stored therein and stores the measurement value of the detector therein. Accordingly, the length of film necessary to photograph an original having a minimum length that has hitherto been photographed is stored in the fourth memory circuit 605. Thereafter, when a shorter original is photographed, the stored content in the fourth memory circuit is varied as previously described. The second comparator circuit 607 is reset after it has terminated the comparison.

Designated by 610 is a subtraction circuit which subtracts the length of photographed film stored in the second memory circuit 603 from the length of film stored in the first memory circuit 602. The subtraction value of the subtraction circuit 610 represents the length of unphotographed film remaining short of the photographing station 29, and this value is sent to a first divider circuit 611 and a second divider circuit 612. The first divider circuit 611 divides the length of unphotographed film operated by the subtraction circuit 610 by the length of the original on the film having a maximum length stored in the third memory circuit 604, and the divisional value thereof represents the number of originals having a maximum length which can be photographed on the unphotographed film. The divisional value of the first divider circuit 611 is displayed by a first display circui 613. The second divider circuit 612 divides the length of unphotographed film operated by the subtraction circuit 610 by the length of film stored in the fourth memory circuit 605, and the divisional value thereof represents the number of originals having a minimum length which can be photographed on the unphotographed film. The divisional value of the second divider circuit 612 is displayed by a second display circuit 614. The third and fourth memory circuits 604 and 605 are reset by operation of the development starting button or operation of the cutter 45 so that the stored contents therein are cleared. The first to fourth memory circuits 602–605 hold their memories irrespective of ON-OFF of the power switch.

Figure 12:
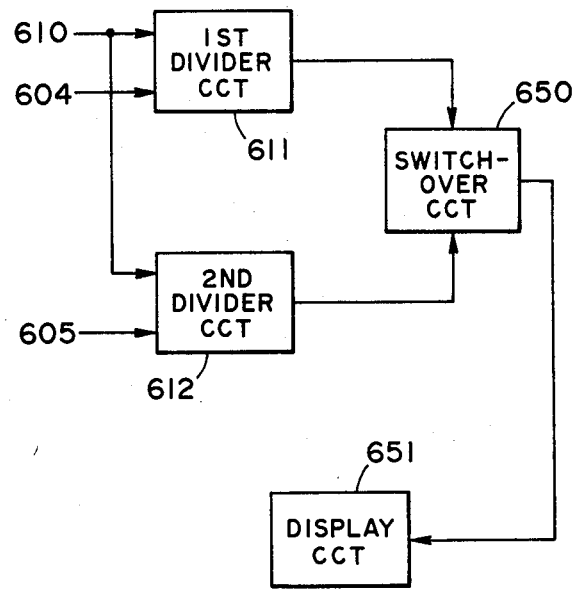
FIG. 12 is a block diagram showing another embodiment of the display device.

FIG. 12 shows another embodiment of the display device. In FIG. 12, reference numeral 650 designates a switchover circuit, and reference numeral 651 denotes a display circuit. The display circuit 651 alternately displays the divisional value of the first divider circuit 611 and the divisional value of the second divider circuit 612 by operation of the switchover circuit 650.

Thus, the display device displays the number of originals having a maximum or a minimum length which can be photographed on the unphotographed film, namely, the film remaining on the supply reel. The operator can efficiently carry out the photographing operation while seeing the display content of the display device.

The present invention is applicable to apparatus such as cameras or electrophotographic copying machines for recording originals on a long footage of sheet.

In the above-described embodiments, the feeding of the film is controlled by the signal of the original feed detector 25 so that the film is fed by a length of film necessary to photograph an original, but alternatively, design may be made such that the length of film necessary to photograph an original is stored in a memory device and the length of film stored in the memory device is read out in accordance with the length of the original and the feed amount of the film is controlled by a signal read out from the memory device.

What is claimed is:

1. A photographing apparatus for photographing originals on a long footage of film, comprising:
 a film supply portion for containing unphotographed film therein;
 feed means for feeding the film from said film supply portion to a photographing station;
 photographing means for photographing originals on the film fed to said photographing station;
 measuring means for measuring the length of the unphotographed film contained in said film supply portion;
 means for calculating the number of originals photographable on the unphotographed film from the length of the unphotographed film measured by said measuring means and the length of film necessary to photograph originals on the film; and
 display means for displaying the number of originals calculated by said calculating means.

2. A photographing apparatus according to claim 1, further comprising selector means for selecting the sizes of originals to be photographed and wherein said calculating means divides the length of the unphotographed film measured by said measuring means by the length of film necessary to photograph the original selected by said selector means.

3. A photographing apparatus according to claim 1, wherein said measuring means includes input means for entering the length of the unphotographed film contained in said film supply portion, and means for calculating the difference between the length of the unphotographed film entered into said input means and the length of photographed film which has passed through said photographing station.

4. A photographing apparatus according to claim 3, wherein said measuring means further includes pulse generating means operable in response to the operation of said feed means to generate pulses each time the film is fed a predetermined length, and counter means for counting said pulses, whereby the length of the photographed film is measured by said counter means.

5. A photographing apparatus according to claim 1, wherein said calculating means includes counter means for counting the number of photographed originals, and divider means for dividing the length of photographed film by the number of originals counted by said counter means, whereby the number of originals photographable on the unphotographed film is calculated by dividing the measurement value of said measuring means by the divisional value of said divider means.

6. A photographing apparatus according to claim 1, wherein said calculating means includes memory means for storing therein the length of film necessary to photograph an original having a maximum or a minimum length among originals of different lengths photographed on the film, whereby the number of originals photographable on the unphotographed film is calculated by dividing the length of the unphotographed film measured by said measuring means by the length of film stored in said memory means.

7. A photographing apparatus according to claim 6, wherein the number of originals having a maximum length which can be photographed on the unphotographed film and the number of originals having a minimum length which can be photographed on the unphotographed film are alternately displayed by said display means.

8. A photographing apparatus for photographing originals on a long footage of film, comprising:
 a film supply portion for containing unphotographed, film therein;
 feed means for feeding the film from said film supply portion to developing means through a photographing station;
 photographing means for photographing originals on the film fed from said film supply portion to said photographing station;
 a storage chamber for storing therein photographed film fed from said photographing station;
 developing means for developing and treating the photographed film fed from said storage chamber;
 measuring means for measuring the length of film that is to be stored in said storage chamber;
 calculating means for calculating the number of originals photographable on the film that is to be stored in said storage chamber from the length of film measured by said measuring means and the length of film necessary to photograph an original on the film; and display means for displaying the number of originals calculated by said calculating means.

9. A photographing apparatus according to claim 8, further comprising selector means for selecting the sizes of the originals to be photographed, and wherein said calculating means divides the length of film measured by said measuring means by the length of film necessary to photograph the original selected by said selector means.

10. A photographing apparatus according to claim 8, wherein said measuring means includes means for detecting the length of photographed film stored in said storage chamber, and subtraction means for calculating the difference between the length of film which can be stored in said storage chamber when said storage chamber is empty and the length of film detected by said detecting means.

11. A photographing apparatus according to claim 10, wherein said measuring means further includes first pulse generating means operable in response to the feed-in of the film into said storage chamber to generate pulses each time the film is fed by a predetermined length, second pulse generating means operable in response to the feed-out of the film from said storage chamber to generate pulses each time the film is fed by a predetermined length, and pulse calculating means for calculating the difference between the number of pulses generated by said first pulse generating means and the number of pulses generated by said second pulse generating means whereby, the length of photographed film stored in said storage chamber is measured by said pulse calculating means.

12. A photographing apparatus according to claim 8, wherein said calculating means includes counter means for counting the number of photographed originals, and divider means for dividing the length of photographed film by the number of originals counted by said counter means, whereby the number of originals photographable on the film that is to be stored in said storage chamber is calculated by dividing the measurement value of said measuring means by the divisional value of said divider means.

13. A photographing apparatus according to claim 8, wherein said calculating means includes memory means for storing therein the length of film necessary to photograph an original having a maximum or a minimum length among the originals of different lengths photographed on the film, whereby the number of originals photographable on the film that is to be stored in said storage chamber is calculated by dividing the length of film measured by said measuring means by the length of film stored in said memory means.

14. A recording apparatus having:
a sheet supply portion for containing a long footage of unexposed sheet therein;
exposure means for recording images on the unexposed sheet;
feed means for feeding the sheet from said sheet supply portion to said exposure means;
measuring means for measuring the length of the unexposed sheet contained in said sheet supply portion;
calculating means for calculating the number of images which can be recorded on the unexposed sheet from the length of the unexposed sheet measured by said measuring means and the length of sheet necessary to record an image on the sheet; and
display means for displaying the calculation value of said calculating means.

15. A recording apparatus according to claim 14, wherein said calculating means includes second measuring means for measuring the length of sheet fed when an image is recorded on the sheet, and means for dividing the measurement value of said measuring means for measuring the length of the unexposed sheet by the measurement value of said second measuring means.

16. A recording apparatus according to claim 15, wherein the fed amount of sheet differs in accordance with the length of the image.

17. A recording apparatus according to claim 15, wherein the length of sheet necessary to record images on the sheet corresponds to the sum of the length of an image on the sheet and the length between the images.

18. A recording apparatus having:
a sheet supply portion for containing a long footage of unexposed sheet;
exposure means for recording images on the sheet fed from said sheet supply portion;
developing means for developing and treating exposed sheet;
a storage chamber disposed between said exposure means and said developing means to store therein the exposed sheet fed from said exposure means;
feed means for feeding the sheet in said sheet supply portion to said developing means through said exposure means and said storage chamber;
measuring means for measuring the length of sheet that is to be stored in said storage chamber;
calculating means for calculating the number of images which can be recorded on the sheet that is to be stored in said storage chamber from the length of sheet measured by said measuring means and the length of sheet necessary to record originals on the sheet; and
display means for displaying the calculation value of said calculating means.

19. A recording apparatus according to claim 18, wherein said calculating means includes second measuring means for measuring the length of sheet fed when an image is recorded on the sheet, and means for dividing the measurement value of said measuring means for measuring the length of unexposed sheet by the measurement value of said second measuring means.

20. A recording apparatus according to claim 19, wherein the fed amount of sheet differs in accordance with the length of the image.

21. A recording apparatus according to claim 19, wherein the length of sheet necessary to record images on the sheet corresponds to the sum of the length of an image on the sheet and the length between the images.

* * * * *